United States Patent
Lykkja

(10) Patent No.: US 12,260,750 B2
(45) Date of Patent: *Mar. 25, 2025

(54) VEHICLE DETECTION SYSTEM

(71) Applicant: Q-Free ASA, Leangen (NO)

(72) Inventor: Ola Martin Lykkja, Trondheim (NO)

(73) Assignee: Q-Free ASA, Leangen (NO)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,379

(22) Filed: Jul. 31, 2023

(65) Prior Publication Data

US 2023/0377458 A1 Nov. 23, 2023

Related U.S. Application Data

(63) Continuation of application No. 17/459,530, filed on Aug. 27, 2021, now Pat. No. 11,756,420.

(30) Foreign Application Priority Data

Aug. 27, 2020 (GB) .................................. 2013430

(51) Int. Cl.
*G08G 1/017* (2006.01)
*G06F 18/211* (2023.01)
(Continued)

(52) U.S. Cl.
CPC ......... *G08G 1/0175* (2013.01); *G06F 18/211* (2023.01); *G06F 18/214* (2023.01);
(Continued)

(58) Field of Classification Search
CPC .... G08G 1/0175; G06V 20/54; H04N 23/667; G06F 18/211; G06F 18/214; G06F 18/251; G06F 18/241; G06N 3/04
(Continued)

(56) References Cited

U.S. PATENT DOCUMENTS

| | | | |
|---|---|---|---|
| 11,756,420 B2 * | 9/2023 | Lykkja | H04N 23/667 340/937 |
| 2003/0011492 A1 * | 1/2003 | Owen | G08G 1/015 340/941 |

(Continued)

FOREIGN PATENT DOCUMENTS

| DE | 102015006714 A1 | 12/2016 |
|---|---|---|
| EP | 2503529 A1 | 9/2012 |

(Continued)

OTHER PUBLICATIONS

Extended European Search Report issued in EP application No. 21193268.6, dated Feb. 2, 2022.

(Continued)

*Primary Examiner* — Kerri L McNally
(74) *Attorney, Agent, or Firm* — Benesch Friedlander Coplan & Aronoff LLP

(57) ABSTRACT

A vehicle detection system 200 comprises: a receiver 202 arranged to receive data transmissions from a vehicle 210; a camera 204 arranged to capture an image of the vehicle 210; and a processing subsystem 206 arranged to implement a trained model for detecting and/or classifying vehicles in an image.

The system 200 is arranged to operate in a first mode wherein: the camera 204 captures an image of a vehicle 210 and the receiver 202 receives a data transmission from the vehicle 210; and the processing subsystem 206 is arranged to use information resulting from the data transmission received and the image to train the model further. The system 200 is also arranged to operate in a second mode wherein: the camera 204 captures an image of a vehicle 210 and the receiver 202 does not receive a data transmission;

(Continued)

and the processing subsystem 206 is arranged to use the image and the trained model to detect and/or classify the vehicle 210 in the image.

20 Claims, 5 Drawing Sheets

(51) Int. Cl.
| | |
|---|---|
| G06F 18/214 | (2023.01) |
| G06F 18/241 | (2023.01) |
| G06F 18/25 | (2023.01) |
| G06N 3/04 | (2023.01) |
| G06V 20/54 | (2022.01) |
| H04N 23/667 | (2023.01) |
| G06V 20/62 | (2022.01) |
| G06V 30/10 | (2022.01) |

(52) U.S. Cl.
CPC .......... *G06F 18/241* (2023.01); *G06F 18/251* (2023.01); *G06N 3/04* (2013.01); *G06V 20/54* (2022.01); *H04N 23/667* (2023.01); *G06V 20/625* (2022.01); *G06V 30/10* (2022.01); *G06V 2201/08* (2022.01)

(58) Field of Classification Search
USPC ........................................................ 340/937
See application file for complete search history.

(56) References Cited

U.S. PATENT DOCUMENTS

| | | | |
|---|---|---|---|
| 2003/0163263 A1* | 8/2003 | Bertrand | G08G 1/042 702/65 |
| 2019/0164049 A1 | 5/2019 | Bai et al. | |
| 2019/0279044 A1* | 9/2019 | Vasisht | G06V 10/17 |
| 2019/0318273 A1* | 10/2019 | Jeng | G06N 5/047 |
| 2019/0378347 A1 | 12/2019 | Gallaway et al. | |
| 2020/0055515 A1 | 2/2020 | Herman et al. | |

FOREIGN PATENT DOCUMENTS

| | | |
|---|---|---|
| EP | 2533223 A2 | 12/2012 |
| ES | 2443081 A2 | 2/2014 |
| RU | 2013118127 A | 10/2014 |
| WO | 2021/230825 A | 11/2021 |
| WO | 2022/055063 A | 3/2022 |

OTHER PUBLICATIONS

Shan Du, et al., "Automatic License Plate Recognition (ALPR): A State-of-the-Art Review", IEEE Transactions on Circuits and Systems for Video Technology, vol. 23, No. 2, Feb. 2013.

Ludmila I. Kuncheva, "Switching Between Selection and Fusion in Combining Classifiers: An Experiment", IEEE Transaction on Systems, Man, and Cybernetics—Part B: Cybernetics, vol. 32, No. 2, Apr. 2002.

* cited by examiner

VEHICLE DETECTION SYSTEM

CROSS-REFERENCE TO RELATED APPLICATIONS

This application claims priority to and is a continuation application of U.S. patent application Ser. No. 17/459,530 filed on Aug. 27, 2021. This application is incorporated herein by reference in its entirety.

FIELD

The invention relates to a system and method for detecting vehicles.

BACKGROUND

Detecting vehicles is crucial to a number of applications. For example, it may be necessary at a tolling station to detect, classify and identify vehicles in order to charge each passing vehicle an appropriate amount. In another application, it is desirable to detect vehicles in order to monitor traffic on a road, for example so that assistance can be sent to any stopped or crashed vehicles.

It may be possible to detect certain vehicles, e.g. which have been provided with systems capable of transmitting information (e.g. WLAN-based V2X transmissions), simply by using an appropriate receiver. However, many vehicles are not equipped with such technology. Detecting and classifying vehicles without such capabilities is challenging. For example, in applications in which cameras are used, human intervention is normally required to analyse images potentially containing vehicles in order to identify the presence of a vehicle and determine characteristics of the vehicle where relevant. Such a set of 'training images' which have been analysed and annotated by a human may be used to train a system to detect and classify vehicles.

However, obtaining large numbers of training images analysed by humans is time consuming. It is further time consuming to train a system such that it can accurately detect and classify vehicles in any location (e.g. on a hill, a winding road) and conditions (e.g. weather conditions, lighting conditions), as this requires an even larger number of training images. Additionally to the time spent creating such large numbers of training images, the training of the system itself using these images such that it effectively detects and classifies vehicles can also be a long process. It is therefore very difficult to build an accurate model which can detect and identify vehicles quickly. This can lead to either large inefficiencies in creating accurate vehicle detection systems or, on the other hand, an inadequately trained, inaccurate vehicle detection system.

An aim of the present invention is to provide an improved vehicle detection system.

SUMMARY

When viewed from a first aspect, the present invention provides a vehicle detection system comprising:
 a receiver arranged to receive data transmissions from a vehicle;
 a camera arranged to capture an image of said vehicle; and
 a processing subsystem arranged to implement a trained model for detecting and/or classifying vehicles in an image;
wherein the system is arranged to operate in at least
 a first mode wherein:
  the camera captures an image of a vehicle and the receiver receives a data transmission from the vehicle; and
  the processing subsystem is arranged to use information resulting from the data transmission received and the image to train the model further; and
 a second mode wherein:
  the camera captures an image of a vehicle and the receiver does not receive a data transmission; and
  the processing subsystem is arranged to use the image and the trained model to detect and/or classify the vehicle in the image.

When viewed from a second aspect, the present invention provides a method of detecting vehicles, the method comprising:
 capturing an image of a vehicle using a camera;
 using a receiver to listen for a data transmission from the vehicle;
 determining whether said data transmission has been received from the vehicle;
 if said data transmission is received from the vehicle, using said image to train a trained model further to detect and/or classify vehicles, and
 if no data transmission is received from the vehicle, using the image and the trained model to detect and/or classify the vehicle in the image.

When viewed from a third aspect, the present invention provides a non-transitory computer-readable medium having stored thereon program instructions that, upon execution by a computing device, cause the computing device to:
 capture an image of a vehicle using a camera;
 listen for a data transmission from the vehicle;
 determine whether said data transmission has been received from the vehicle;
 if said data transmission is received from the vehicle, use said image to train a trained model further to detect and/or classify vehicles, and
 if no data transmission is received from the vehicle, use the image and the trained model to detect and/or classify the vehicle in the image.

Thus it will be seen by those skilled in the art that in accordance with the present invention, information resulting from data transmitted from a vehicle is used together with captured images to provide data for improving the trained model for detecting and/or classifying vehicles, but if no data transmission is received, the model can be used to detect and/or classify the vehicle. The may provide a robust and reliable system which can detect/classify vehicles based on information provided by them but which can be usefully deployed before all, or even most, vehicles are equipped to do this and also to provide a back-up where the data transmission and/or receipt of resulting information does not function as intended. This may reduce the breadth of training data required, or eliminate the requirement for training data before a vehicle detection system can be implemented.

Using image recognition to detect and/or classify vehicles may be advantageous in requiring less physical roadside infrastructure than in prior art systems which include laser detectors which must be on separate gantries to cameras and DSRC receivers.

The training of the model in accordance with the present invention will typically be a machine learning process. Initial training may be carried out using a set of images and corresponding classification information which could for example be generated by human input to indicate simply whether an image contains a relevant vehicle or not (e.g. if the model is to be used only for detection) or to classify the vehicle (e.g.: van, lorry, motorbike, car; saloon, hatchback, 4×4, SUV; large, medium, small etc.). Such input may also indicate whether the vehicle is facing towards or away from the camera in the image.

In accordance with the invention further training during use of the system does not need to involve additional human input in the form of analysing and annotating large numbers of training images. Instead further training can be carried out automatically while the system is in use, as in cases where the vehicle sends a data transmission this can contain, or be used to access, information which can be reliably used to associate an image captured at the same time with the appropriate classification (or simply presence) of the vehicle. This may continually improve the detection and/or classification of vehicles over time, as the number of iterations of using the transmission received from a vehicle and images captured by the camera to train the model to detect and/or classify a vehicle increases.

The trained model may comprise a neural network. Basic training of neural networks to identify vehicles from images is known in the art. For example, using neural networks to determine of license plate number of a vehicle in an image is used widely for tolling and law enforcement. Refining the neural network by further training in accordance with the invention may strengthen certain pathways to create a more accurate model.

A common problem with machine learning models is to use the right number of parameters in the model. Too many parameters will result in overfitting where the model works very well on the trained images, but less well in a deployed environment. Too few parameters will typically result in wrong classifications. Different types of machine learning models will handle this problem differently.

In a set of embodiments the neural network comprises a convolutional neural network (CNN). In a CNN one or more steps of pre-processing are applied to reduce the data volume and the number of parameters. Convolutional neural networks may have one or more convolution layers effectively creating one or more derived images from the input image. The convolution layer (or process) may employ a sliding window with weights that is applied to a subsection of the image to produce a weighted average value for each subsection. The process may be considered to be similar to how a human may focus on a part of an image by employing a magnifying glass.

In a set of embodiments the convolution process is arranged to provide an output image where the resulting size is independent of the input image size (i.e. camera resolution). Before the convolution process, standard machine learning procedures may include converting colour input images to grayscale, cropping areas where no vehicle should be detected, and normalizing grayscale values applied. Convolution filters may be arranged to detect edges and corners in the image. This means that the inner layers of the model will work on edges and corners in the original image and not areas of uniform colour.

In some embodiments to reduce the size of the input data and thus the model parameters, another non-linear convolution step may be applied to extract a strongest image feature, e.g. edge or corner, in each of a plurality of subsections. While training the model, it may be important to have a relevant cost function to measure the n-dimensional distance between the known classification vector and the output from the neural network. In general, neural networks will have better performance as additional layers are added, but this requires a larger training dataset. In the context of the current invention, there may be a large amount of images with known classification making it possible to benefit from the additional layers.

This invention may also be implemented with non-CNN model types.

The present invention may further enable improved detection of vehicles as systems can be further trained in the relevant implementation location of the system (i.e. in situ). For example, a particular system may be located in a region that is subject to low light conditions (e.g. in a valley) or in a city where sunlight is reflected from nearby buildings and thus it is more useful to refine the trained model for these systems to detect vehicles in low light or reflected light conditions respectively. Further training the model of that system based on images captured during its ongoing use allows the model to account better for its surroundings, for example the landscape, nearby buildings, flora etc. This may result in a more accurate model and more consistent detection of vehicles as the system becomes tailored to a particular location of implementation.

Moreover, the conditions within any particular location of implementation will typically vary over the course of the day or over a year. For example, a system may be required to detect and/or classify vehicles in both daylight and night time conditions. The system may also be required to detect and/or classify vehicles in winter months where ice and snow are common, and in the summer months with bright sunshine. The further, localised and ongoing training provided in accordance with the invention can beneficially accommodate this.

Detecting a vehicle involves determining whether a vehicle is present, e.g. within a certain range or in a certain zone. The range may correspond to the range in which the receiver can receive transmissions from a vehicle and/or the field of view of the camera. Classifying a vehicle involves determining at least one characteristic feature of a vehicle, where the characteristic feature distinguishes the vehicle from at least a plurality of other vehicles.

The data transmission may include a variety of different types of data. In a set of embodiments, the data transmission comprises a unique identification code. The unique identification code may, for example, be the license plate number of the vehicle.

The data transmission received from the vehicle may comprise other information about the vehicle. This information may be transmitted in addition to or instead of a unique identification code. In a set of embodiments therefore, the data transmission comprises at least one vehicle parameter. For example, vehicle parameters may include about the model, length, height or classification of the vehicle. The vehicle parameter may be used to classify the vehicle in accordance with one or more of the features of the vehicle, e.g. type of vehicle (motorbike, car, lorry etc), size of vehicle (height, length, profile etc). The classification of a vehicle may be used in tolling applications to correctly charge the detected vehicle according to predetermined toll groups, analysis of road use, dispatching of appropriate assistance etc.

Should the data transmission not comprise a vehicle parameter at all (e.g. containing no more detailed information about the vehicle than a unique identification code) or not contain all required parameters, it may still be desirable to obtain any such 'missing' parameters from elsewhere. In a set of embodiments, the system is arranged to send data from the data transmission to an external server and to receive from the server at least one vehicle parameter (e.g. model, colour, length, height, classification). The external server, for example, may be controlled by a vehicle licensing agency. In this way the processing subsystem receives information resulting from data in the data transmission which it can use for classification.

In a set of embodiments, in the second mode of operation identifying the vehicle comprises determining at least one vehicle parameter using the captured image.

In a set of the embodiments above the vehicle parameter is used by the processing subsystem in the first mode to train the model further by correlating the parameter to the captured image. This could be done whether the parameter is received in the data transmission or from an external server.

As mentioned above, the data transmission may comprise a unique identification code. This may comprise, or may be capable of being matched to, a license plate number for the vehicle. Systems in accordance with the invention may additionally or alternatively be arranged to determine a license plate number. This could be done using the trained model but in a set of embodiments a dedicated image recognition algorithm is used. Such Automatic License Plate Recognition algorithms are well known per se in the art. In a set of embodiments the dedicated image recognition algorithm uses the same captured image as is used by the trained model for detection/classification set out herein. The system could determine license plate numbers whenever a vehicle is detected (e.g. for verification purposes) or only when no data transmission is received.

It may be beneficial in certain applications to implement an additional mode in which the data transmission is simply used for detecting and/or classifying the vehicle (i.e. rather than further training the model). This may reduce the power consumption of the system, or allow the system to continue to operate in a situation in which an image in not captured or is too poor to be beneficial in further training (e.g. the camera is broken, the image captured is partly obscured etc.). Similarly, whilst further training the model could be carried out substantially at the same time the data is captured, this is not essential. For example the data transmissions and corresponding images could be batch processed by the system during quieter periods such as at night. Further training the model could be carried out locally to where the camera and receiver are located or the data transmissions and corresponding images could be transmitted to a remote server.

The camera may be any suitable and desirable type of camera. Whilst the camera may be arranged to capture any desirable form of electromagnetic radiation (e.g. infra-red radiation), in a set of embodiments the camera is an optical camera. The camera may comprise any suitable or desirable lens, for example an ultra wide-angle ('fish-eye') lens. Implementing an ultra wide-angle lens helps to achieve a wide panoramic or hemispherical image, which may improve the range for vehicle detection and/or identification.

The camera may be installed in any suitable or desirable position, for example, by the side of a road or on a gantry above a road. The camera is ideally positioned such that an unobscured and clear image of a vehicle may be obtained.

In a set of embodiments, the system comprises a plurality of cameras. The plurality of cameras may be arranged at different positions and/or angles, such that multiple images may be captured of a vehicle from various angles and positions (e.g. at different positions along a road). The plurality of cameras may comprise various types of cameras (e.g. optical cameras, infra-red cameras). The plurality of cameras may capture images at different exposure levels (also called high dynamic range imaging) to account for varying light conditions within the field of view. This may allow additional information to be obtained from the images for detection and/or classification compared with implementing only a single camera. A single common trained model may be used to analyse images from the plurality of cameras or different cameras may be associated with different trained models or different neural networks or sub-networks within a trained model.

In a set of embodiments, the camera(s) is arranged to capture a plurality of images. By capturing a plurality of images, an increased number of images are obtained for use in the further training of the model, which may further improve the model. Similarly extra images may improve the chance of the trained model(s) successfully detecting and/or classifying the vehicle in the second mode.

Alongside detecting and/or classifying a vehicle, it will typically be important to track the vehicle—e.g. to ensure that vehicles are correctly detected even if they are close together or take evasive action such as attempting to avoid detection by a tolling system. The vehicle may be tracked in any suitable or desirable manner, however preferably the vehicle is tracked using a plurality of (consecutive) images. A plurality of images may be captured of the vehicle using either a single camera over a period of time, or by multiple cameras at various locations along the route of the vehicle (e.g. forward and rearward facing). The first mode of operation may additionally include the camera(s) capturing a plurality of images, and the processing subsystem using the transmission and the images to train or further train the model to track vehicles. The second mode of operation may additionally include the camera(s) capturing a plurality of images, and the processing subsystem using the images and the trained model to track the vehicle in the images.

In some examples, tracking vehicles comprises determining whether one or more vehicles is approaching, if so how many, and whether a given vehicle is moving or stationary. Detecting that a vehicle is stationary may indicate that there has been an accident or a break-down, and this may trigger assistance to be sent to the vehicle. The vehicle tracking may also allow the vehicle speed to be determined. Determining vehicle speed may be used in applications in which speed is monitored to promote or enforce speed limits.

The receiver may be arranged such that it only receives a signal from a vehicle when the vehicle is within a predetermined distance of the receiver (limited by the range of the communication signals). Alternatively a zone may be defined—e.g. by means of road markings. Communications may be one-way from the vehicle to the system such that the vehicle has just a transmitter and the system has just a receiver. Equally however communications may be two-way.

The receiver may be arranged to receive any suitable and desirable form of data transmission from a vehicle. A vehicle may comprise a transmitter or transceiver with an 'on board unit' (OBU). The transmission may comprise a Cooperative Intelligent Transport Systems (C-ITS) message, using ETSI-G5 or Cellular V2X technologies, which includes information which may uniquely identify the vehicle and/or provide vehicle size or class information. Alternatively such communications are dedicated short-range communications e.g. following the European Committee for Standardisation (CEN) dedicated short range communication (DSRC) standard. In a set of embodiments therefore, the receiver is a CEN DSRC receiver arranged to receive a CEN DSRC transmission from a vehicle. The receiver may comprise part of a 'road side unit' (RSU) which is arranged to communicate with the OBU in a vehicle.

The arrangement of the system may allow a polling operation to be performed and thus in a set of embodiments, a transmission from a vehicle is acquired using a polling operation. The polling operation may comprise transmitting a polling signal from the system (e.g. the RSU) and receiving a response signal transmitted by the vehicle (e.g. transmitted from the OBU) at the system. Preferably the response signal comprises the data transmission. This process may help to conserve the power source (e.g. battery) of a transceiver in the vehicle, as the transceiver need not transmit a signal unless it receives the polling signal from the system (e.g. the transceiver is not required to transmit a signal continually).

In a set of embodiments, the system comprises a plurality of receivers. The plurality of receivers may be arranged in any suitable or desirable manner. For example, the plurality of receivers may be arranged at various positions along a road. In embodiments in which the system comprises a plurality of cameras, each of the plurality of receivers may be located with a (corresponding) camera. This may ensure better correlation between the transmitted signal and an image captured by a camera, for example helping to ensure that the vehicle captured in an image corresponds to the vehicle transmitting the signal.

The plurality of receivers may also comprise various types of receivers. The different types of receivers, may be arranged to receive various different types of transmission from a vehicle (e.g. CEN DSRC, Cooperative Intelligent Transport Systems (C-ITS), radio). Implementing various types of receivers may increase the number of transmissions received by the system, and therefore the number of transmissions that can be used to refine the model in the first mode of operation of the system.

The processing subsystem may be located in the vicinity of the camera(s) and/or receiver(s), however the processing subsystem may also or instead be located remotely. In either of these embodiments, the receiver(s) and camera(s) may be arranged to transmit data (e.g. the data transmission received from a vehicle and the image captured) to the processing subsystem. Especially in embodiments in which the processing subsystem is remote, preferably the transmission from the receiver and camera to the processing subsystem is a wireless transmission.

In a set of embodiments, the processing subsystem is arranged to pre-process the image based on external information separate from the image and the data transmission. Pre-processing the image may help in the first mode of operation to ensure that only appropriate images, e.g. those likely to be of high quality, are used to further train the model.

Pre-processing the images may help to improve the accuracy of the system in detecting and/or classifying and/or tracking vehicles. By pre-processing images, the model can be trained to account for different conditions which may change how the model functions to detect, classify or track a vehicle. In embodiments in which the model comprises a neural network, the relevant external information may be used alongside the image and data transmission to refine the neural network. The neural network may then account for the relevant conditions when the system is operating in the second mode to improve the detection and/or classification and/or tracking of a vehicle.

In embodiments in which the model comprises a plurality of neural networks, a specific neural network may be selectively trained depending on the external information relating to the conditions during capture of the image. This may result in a plurality of neural networks wherein each is specialised to detect and/or classify and/or track a vehicle in particular conditions, improving the accuracy of the system and method.

The Applicant has also recognised that it may be important for successful further training of the model that the images used are of a sufficiently high quality. In a set of embodiments therefore the pre-processing could be used to determine whether to use a captured image for training at all.

By pre-processing images using the external information, in the second mode of operation an appropriate neural network of a plurality of neural networks can be selected depending on the external information. This may lead to an improved detection and/or classification and/or tracking of a vehicle, as an appropriate neural network can be selected which is optimally trained to analyse the image captured in the specific conditions detected.

The captured image may be pre-processed based on any one or more of a number of different types of external information. In an exemplary set of embodiments the image is categorised based on conditions in the locality of the system (in particular the locality of the camera). For example, the image may be pre-processed based on the light conditions and/or the weather conditions. Exemplary categories of such information include raining, snowing, sunshine, daytime/night time and time of year.

To determine the conditions in the locality of the system, the system (e.g. the processing subsystem) may communicate with an external data source to obtain information on one or more conditions in the locality of the system. The external data source could, for example, be a weather data server or sunrise/sunset calendar. Additionally or alternatively, in a set of embodiments, the system comprises a sensor subsystem arranged to monitor the condition(s). In a particular set of embodiments, the sensor subsystem comprises a light sensor such as a solar panel or a photodiode arranged to provide an indication of a light level. Similarly, the sensor subsystem could include a rain sensor and/or a temperature sensor arranged to provide an indication of the weather conditions.

BRIEF DESCRIPTION OF DRAWINGS

Some preferred embodiments of the present invention will now be described, by way of example only, and with reference to the accompanying drawings, in which.

DETAILED DESCRIPTION

Figure 1:
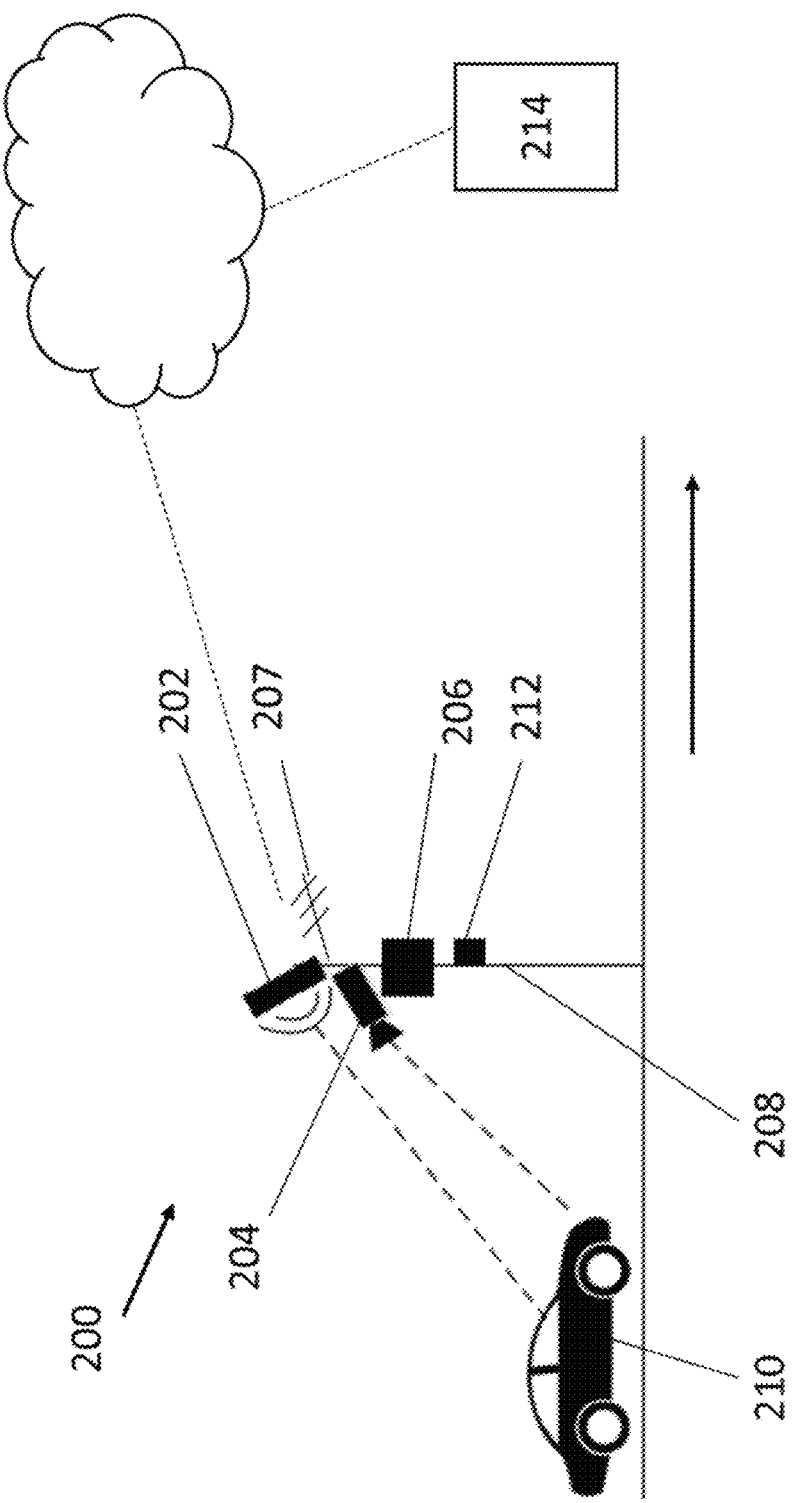
FIG. 1 is an illustration of a system in accordance with an embodiment of the present invention.

FIG. 1 illustrates a system in accordance with an embodiment of the present invention. The system 200 shown in FIG. 1 comprises a single gantry 208. The gantry 208 includes the following mounted components: a CEN DSRC transceiver 202, a camera 204, a processing subsystem 206, a cellular data transceiver 207 and a condition monitoring system 212. The arrow shown indicates the direction in which the vehicle is driving.

The CEN DSRC transceiver 202 is arranged to communicate with a CEN DSRC tag (not shown) in a vehicle 210. As is known per se in the art, the CEN DSRC tag transmits data identifying the vehicle to the CEN DSRC transceiver 202. This information includes a unique identification number (e.g. the license plate number) as well as information such as the size and class of the vehicle 210. However, it is appreciated that not all vehicles may possess a working CEN DSRC tag, therefore a system which relies solely on receiving such identifying information would be ineffective at detecting, identifying and/or classifying all vehicles. Therefore, as will be described below, the system 200 also includes image recognition capability to detect and/or identify a vehicle 210 from which no transmission is received.

The CEN DSRC tag may not transmit a data transmission until a polling transmission is received by the tag. To account for such circumstances, the CEN DSRC transceiver 202 periodically transmits a polling signal. Any suitable equipped vehicles 210 should then transmit a data transmission to the system 200 in response.

The camera 204 is arranged to capture images along the road on which the system 200 is installed. The captured images are processed by the processing subsystem 206. The processing subsystem 206 implements, and in some circumstances further trains, a trained model comprising a convolutional neural network as discussed in more detail below in relation to FIG. 3.

Figure 2:
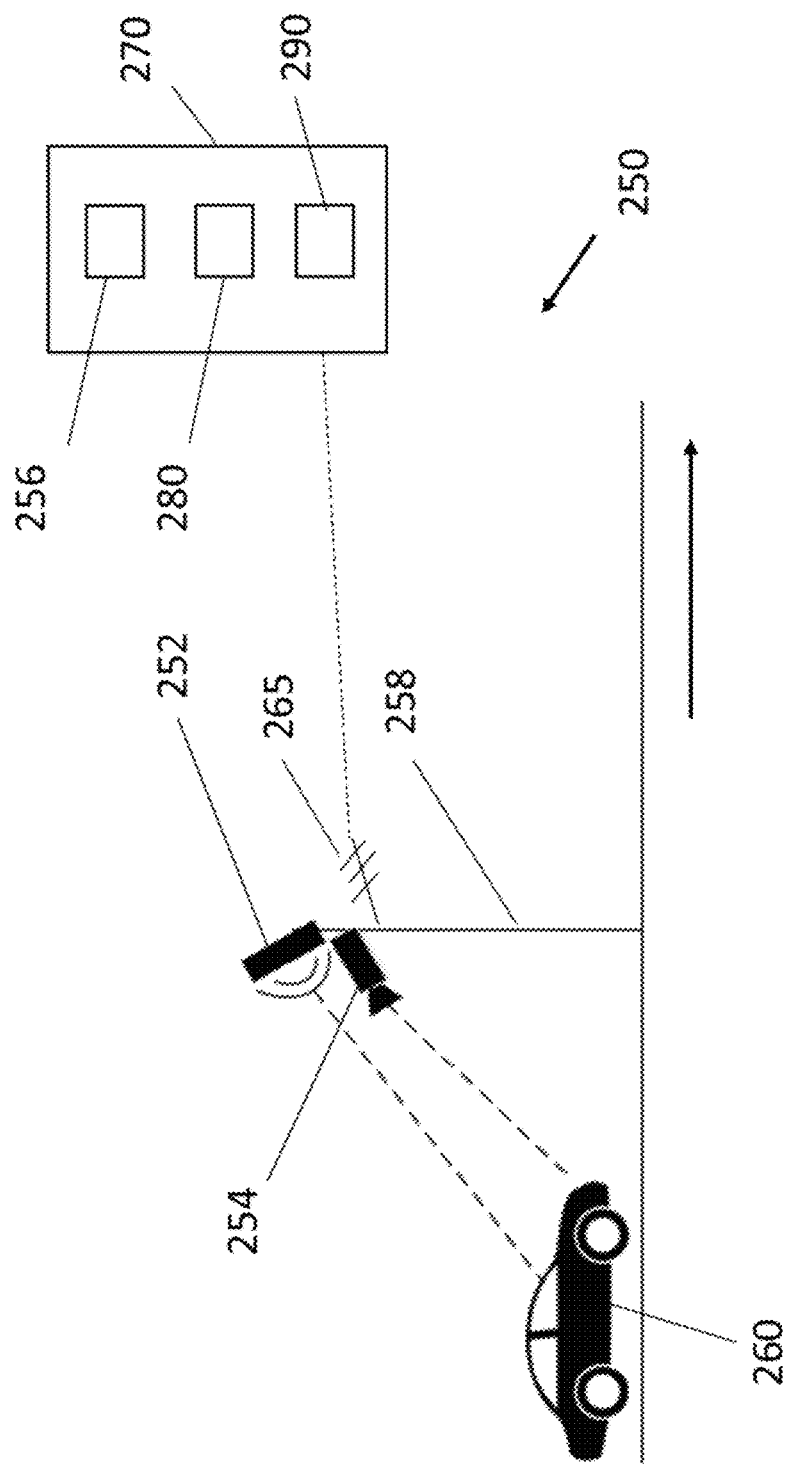
FIG. 2 is an illustration of a system in accordance with another embodiment of the present invention.

The system 200 shown in FIG. 1 further includes an environmental monitoring system 212. The monitoring system 212 contains a light sensor and rainfall sensor for determining the environmental conditions in the locality of the system 200. The information from the monitoring system 212 is used to help categorise the images captured by the camera 204, which is also discussed in more detail in relation to FIG. 3. The environmental conditions could alternatively be requested from other external sources (e.g. a weather service) as shown in FIG. 2. In either case the processing subsystem 206 may also be programmed with information about the camera geometry such that it can assess what environmental conditions may impair the image capture process. (e.g. a west-facing camera may be affected in evening at a time corresponding to sunset).

The system 200 communicates with an external server 214 via the cellular data transceiver 207 which connects to a public mobile data network. Alternatively a wired connection to a fixed network, e.g. comprising fiber optic cable, could be provided. The external server 214 shown in FIG. 1 is for example a cloud-based database compiled by a licensing agency which allows a unique identifying number (e.g. a license plate number) of a vehicle to be used to look up additional information about the vehicle such as the model, colour, length, height, classification of the vehicle.

FIG. 2 illustrates a system in accordance with another embodiment of the present invention. Similarly to the system 200 shown in FIG. 1, the system 250 shown in FIG. 2 includes a camera 254 arranged to capture images along the road on which it is installed and a CEN DSRC transceiver 252 arranged to communicate with a CEN DSRC tag (not shown) in a vehicle 260 to receive data transmissions as previously described. The camera 254 and the CEN DSRC receiver 252 are mounted on a gantry 258.

However, in contrast to the embodiment shown in FIG. 1, the processing subsystem 256 which implements and further trains the neural network is located remotely. In FIG. 2, the processing subsystem 256 is part of a server system 270. The server system 270 additionally comprises a weather data server 280 and a vehicle licensing agency server 290. The weather data server 280 provide information on the weather conditions in the locality of the system. The vehicle licensing agency server 290 provides additional information about the vehicle 260 associated with a unique identification number such as the model, colour, length, height, classification of the vehicle 260.

Operation of the embodiments of FIGS. 1 and 2 will now be described with reference to FIG. 4 which is a flowchart of a method of detecting and identifying vehicles using the system shown in FIGS. 1 and 2. In step 402, a camera 204, 254 captures an image. The camera 204, 254 may be arranged to continuously capture images.

In the system 200 shown in FIG. 1, a wired or wireless connection is used to communicate the captured images from the camera 204 to the processing subsystem 206. For system 250 shown in FIG. 2, which includes a remote processing subsystem 256, the method comprises an additional step of transmitting the captured images to the remote processing subsystem 256 (or more generally the server system 270). The transmitter 265 transmits the image via the mobile communication network to the remote processing subsystem 256.

In step 404, the image captured by the camera 204, 254 is pre-processed by the processing subsystem 206, 256 based on information obtained from the environmental condition monitoring system 212 or the weather data server 280. As will be explained below, pre-processing using such external information is used to select the most appropriate neural network or to enhance the further training which can be provided.

In a simple form, this pre-processing could be dependent on light conditions under which the image was captured where the condition monitoring system 212 provides information on the light levels detected. The processing subsystem 206 uses the information provided by the condition monitoring system to label the images by the light levels under which they were taken.

In a more complex form, the categories could be expanded further. Further information regarding the weather conditions, obtained from the monitoring system 212 or via communication with an external server 214, 270 could be used to provide more detailed categories. In the system 250 of FIG. 2 for example, a local weather report obtained from the weather data server 280 may be used by the processing subsystem 256 to label the image captured by the camera 254 according to categories such as sunshine, cloud, rain and snow.

In step 406, the system 200, 250 determines whether the CEN DSRC transceiver 202, 252 has received a data transmission signal from a DSRC tag in the vehicle 210, 260.

The system 200, 250 may determine in step 406 that a transmission is not successfully received. This may be either due to either no vehicle being present e.g. in the range of the CEN DSRC receiver 202, 252 and/or in the camera image, or a vehicle 210, 260 passing through the system which has no CEN DSRC tag, or the transmission suffering too much interference.

In step 416, the processing subsystem 206, 256 uses the model and the captured image to determine whether a vehicle is present. In examples where the model comprises a plurality of convolutional neural networks, the label may be used to choose an appropriate CNN. More specifically several steps of pre-processing are applied to reduce the data volume and the number of parameters. The CNN has multiple convolution layers effectively creating multiple derived images from the input image. The convolution layer (or process) employs a sliding window with weights that is applied to a subsection of the image to produce a weighted average value for each subsection. The convolution process results in an output image where the resulting size is independent of the input image size (i.e. camera resolution). Before the convolution process, standard machine learning procedures are employed including converting colour input images to grayscale, cropping areas where no vehicle should be detected, and normalizing grayscale values applied. Convolution filters are arranged to detect edges and corners in the image. This means that the inner layers of the model will work on edges and corners in the original image and not areas of uniform colour.

To reduce the size of the input data and thus the model parameters, another non-linear convolution step is applied to extract a strongest image feature, e.g. an edge or corner, in each of the subsections. The large amount of images with known classification which are provided by embodiments of the invention make it possible to benefit from additional layers compared to what might typically be used.

In step 418 the processing subsystem 206, 256 determines whether a vehicle has been detected.

If at step 418 it is determined that there is no vehicle present in the captured image, the method starts again from step 402.

Alternatively, at step 418, if the system 200, 250 determines a vehicle 210, 260 has been detected, i.e. a vehicle 210, 260 is present in the image, the processing subsystem 206, 256 uses the captured image, the pre-processing label and the model to classify the detected vehicle 210, 260 (step 420). In examples where the model comprises a plurality of neural networks, the label may be used in this step to select an appropriate neural network. Unique identification may also be carried out using a license plate recognition algorithm.

However, in some applications or instances, it may not be possible or necessary to correctly uniquely identify the vehicle 210, 260 from the captured image. For instance, whilst the system may include a license plate recognition algorithm, it may be unable to determine the license plate e.g. owing to the resolution of the image, the size of the number plate in the image. In other applications, the system 200, 250 may not be designed to identify a license plate. In such instances, the system 200, 250 may simply classify the detected vehicle 210, 260 based on relevant parameters (e.g. the length and/or width of the vehicle). Classifying the detected vehicle 210, 260 based on the relevant parameters may be sufficient, for example, to classify the vehicle in the correct toll tariff so that the vehicle 210, 260 can be charged appropriately at a tolling station. The classification of the detected vehicle may also be sufficient to provide data for analysis of road use, for example how much each classification of vehicle (e.g. motorcycle, car, lorry) uses the road.

Alternatively, if a transmission has been successfully received at step 406, step 408 is implemented. In step 408 the system 200, 250 identifies the vehicle 210, 260 based on the transmission received. The signal received by the CEN DSRC transceiver 202 includes a unique identification code, therefore providing a unique identification of the vehicle. This unique identification code could be the license plate number or some other unique identifier which can be used to determine the license number from the licensing agency server 290.

The system 200, 250 then proceeds in step 410 to determine relevant information and parameters relating to the vehicle 210, 260 using the transmission received in step 408. Whilst the transmission received in step 408 may already include additional information such as the model, classification (for example whether car, lorry, motorcycle), dimensions of the vehicle 210, 260, it may instead be necessary for such relevant information to be obtained by communicating with a remote server 214, 290. The classification and/or dimensions of the detected vehicle 210, 260 determined in step 410 may be used in tolling applications to levy a charge suitably according to predetermined toll tariffs. This may allow for an owner of the vehicle 210, 260 to automatically be charged the correct toll at the toll gate, without relying on the driver or an operator to select the correct toll tariff for the vehicle. Additionally, an account associated with the unique identification number of the vehicle 210, 260 is automatically debited with a suitable charge based on the classification of the vehicle 210, 260. Account information may be held in a payment server (not shown). In the system 250 of FIG. 2, a payment server may be included in the server system 270.

The additional information and parameters relating to the vehicle 210, 260 determined in step 410 may also be used to analyse road use. This could be performed by a component of the system 200, 250 such as the server system 270 and/or analysis could take place in a separate remote system.

In step 412, the captured image is labelled by the processing subsystem 206, 256 with the relevant information, such as the model, classification and dimensions of the vehicle 210, 260 determined in step 410. The image may additionally be labelled with the category determined in step 404.

In step 414, the labelled image is used to train the model further. For a model that comprises a neural network, the further training involves strengthening certain pathways within the neural network to create a more accurate model. In particular, using a labelled image may help to strengthen links and pathways in the neural network. While training the model, a relevant cost function is used to measure the n-dimensional distance between the known classification vector and the output from the neural network. In general, neural networks will have better performance as additional layers are added, but this requires a larger training dataset. This is exploited in accordance with the invention where a continuously growing training set is available.

In examples where the model comprises a plurality of neural networks, the label assigned to the image in step 404 may be used to select a suitable neural network specific to the label (e.g. environmental conditions) to further refine. As different neural networks are provided with different images according to their categorisation, different pathways will be strengthened in different neural networks. Over the course of multiple iterations of further refinement, the different neural networks may become increasing different as different pathways are strengthened.

Whilst step 410, step 412 and step 414 may take place sequentially directly after step 408, these steps may occur at a later point. The identification of the vehicle based on the transmission may be stored, e.g. in a memory within the system or in an external cloud storage, and steps 410 to 414 completed at a later point. Alternatively, only step 412 or step 414 may be delayed. For example, step 414 may only be implemented once a significant number of labelled images have been acquired by the system 200, 250. The training of the model may then occur in batches, for example once a day, rather than continuously throughout the day.

A delay in implementing one or more of steps 410 to 414 may occur when, for example, the road on which the system 200, 250 is implemented is experiencing a high volume of traffic and the time delay between consecutive vehicles 210, 260 is small, helping to reduce the overall workload of the system during this period.

Typically the method is repeated continually, many times a second

Figure 4:
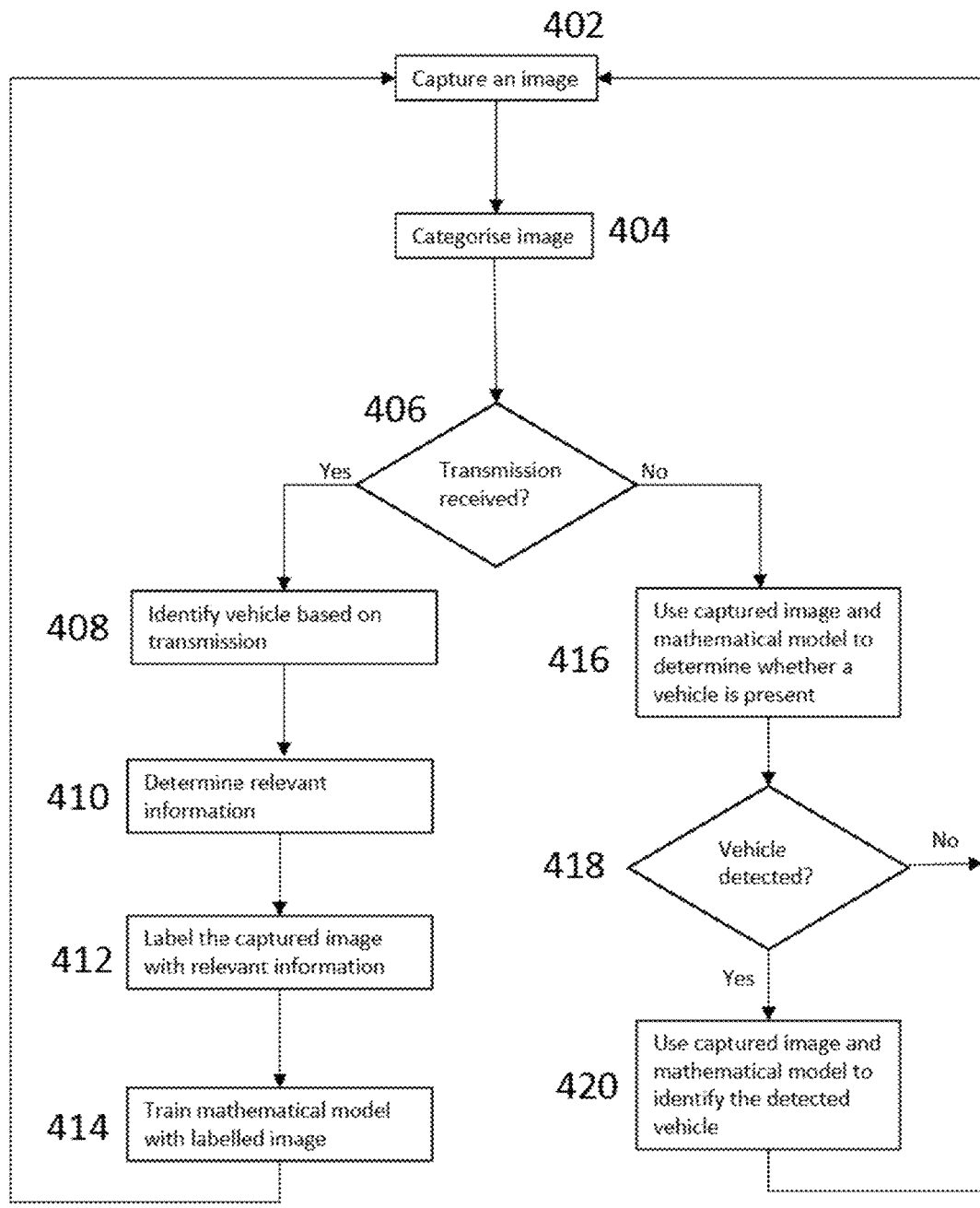
FIG. 4 is a flowchart illustrating a method of training and implementing a model in accordance with an embodiment of the present invention.

Repeating the steps set out in FIG. 4 enables the tracking of a detected vehicle 210, 260, by identifying the same vehicle to be present in consecutive images captured. This may allow a system 200, 250 additionally to determine the trajectory of a detected vehicle and its speed e.g. to ensure accurate counting of vehicles and capturing vehicles that have only one license plate or different license plates on the front and rear. This may also allow, for example, determination that a vehicle has stopped, and to request assistance for the stopped vehicle.

In an alternative embodiment where polling is not continually performed, following the detection of a vehicle in step 418, the system performs a polling operation—i.e. the DSRC transceiver 202, 252 transmits a polling signal which is received by any CEN DSRC tags in a vehicle 210, 260. A CEN DSRC tag then responds with an identifying transmission. In this embodiment, the model is used to detect the vehicle 210, 260, the identifying transmission is used to identify the detected vehicle, and step 420 is unnecessary. Should no response be received by the CEN DSRC transceiver then step 420 is conducted as described above.

Figure 5:
FIGS. 5 and 6 are exemplary captured images which have been classified by a system in accordance with an embodiment of the present invention.
Figure 6:
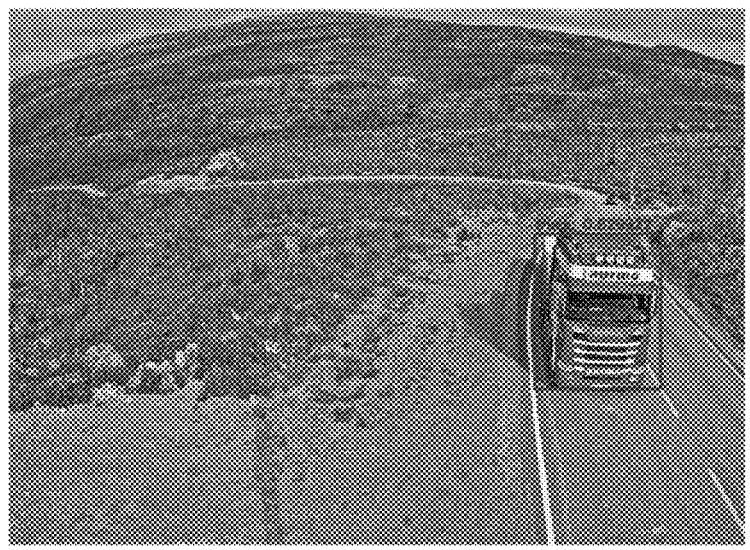

FIGS. 5 and 6 show two examples of a detected vehicle being classified from a captured image. In the cases of the detected vehicles shown in FIGS. 5 and 6, it may not be possible to identify the vehicle (e.g. determine the license plate number of the vehicle) from the captured image. In FIGS. 5 and 6, the license plate number is obscured by the lights of the vehicle and by the resolution of the captured image. The model determines the rough outline of the vehicle (as shown by the bordering box around the vehicle) and then classifies the vehicle. In FIG. 5 the vehicle has been classified as a small car, and in FIG. 6 the vehicle has been classified as a truck. Such classification are useful in tolling applications, or for gaining general information about the use of the area (e.g. road) which the system monitors. A numerical confidence level is also assigned to the classification. The confidence level ranges from 0 to 1. A confidence level of 0 indicates no confidence in the classification of the vehicle, and a confidence level of 1 indicates complete confidence in the classification of the vehicle. In practise, the confidence level will assume values between 0 and 1, and not the value of one of these extremities.

Figure 3A:
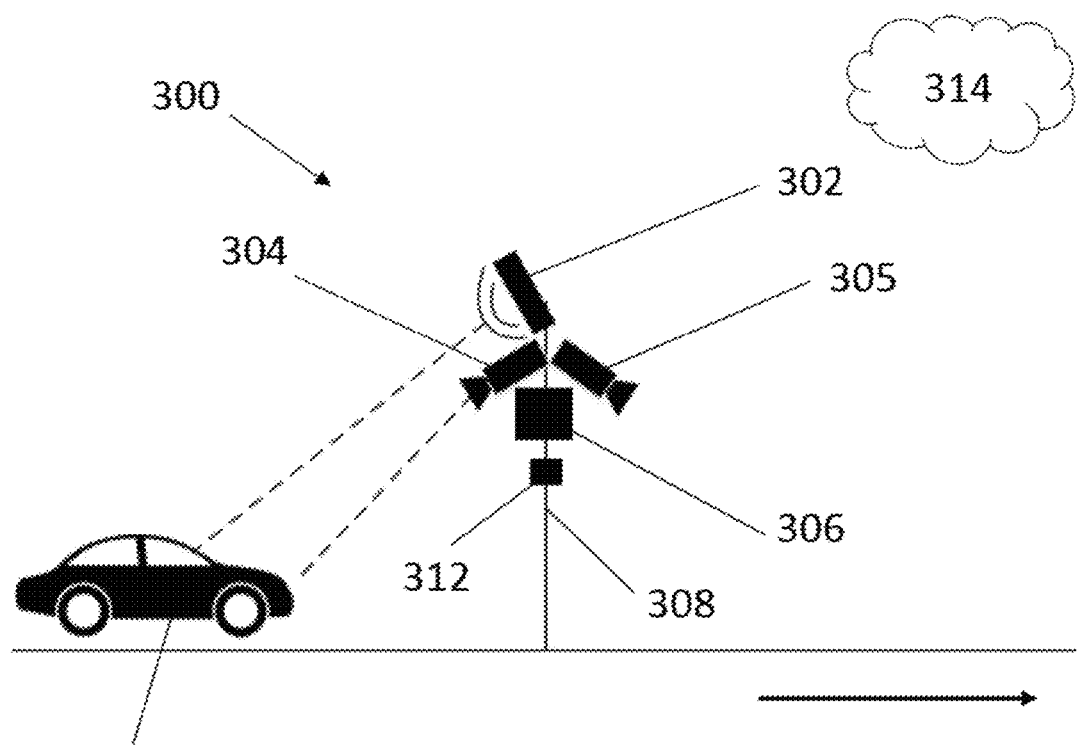
FIGS. 3*a* and 3*b* are illustrations of a system in accordance with another embodiment of the present invention.
Figure 3B:
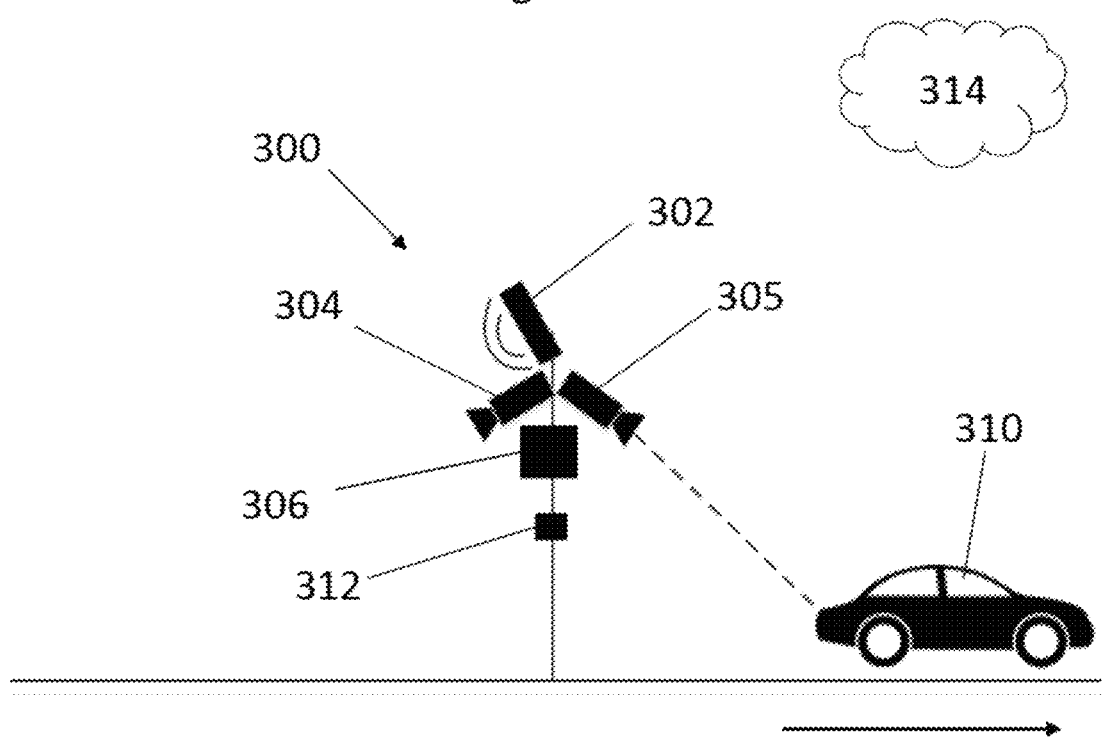

Whilst the systems 200 and system 250 of the first and second embodiments only comprise a single camera 204, a similar system 300 is shown in FIGS. 3a and 3b which comprises two cameras 304, 305. The first camera 304 and the second camera 305 are positioned on the gantry 308 such that they can obtain images in different directions. In the particular arrangement shown in FIGS. 3a and 3b, the first camera 304 may capture an image of the front of the vehicle 310 as the vehicle 310 progresses toward the gantry 308 (as shown in FIG. 1) and the second camera 305 can capture an image of the rear of the vehicle 310 as the vehicle 310 moves away from the gantry 208. This may improve the tracking capabilities of the system 300, or allow more information on a vehicle 310 to be obtained as is explained below.

Similarly to the embodiment shown in FIG. 1, in FIGS. 3a and 3b the images captured by both cameras 304, 305 are communicated to a processing system 306. The processing subsystem 306 refines the model differently depending on whether an image received is captured by the first camera 304 or the second camera 305. This allows differences in the surroundings, for example the landscape, nearby buildings, flora etc., in the field of view of the first camera 304 and second camera 305 to be accounted for in the model. This also enables differences in the portion (e.g. front and rear) of a vehicle 310 captured in an image to be accounted for in the model and to capture images including the front and rear license plates.

In the system 300, which include two cameras 304, 305, both cameras 304, 305 typically continuously captures images. Tracking of the vehicle 310 can be performed over an extended section of road on which the system is installed, as the vehicle 310 can be tracked first using consecutive images captured by the first camera 304 and then tracked using consecutive images captured by the second camera 305.

Furthermore in this embodiment, the processing subsystem 306 additionally labels an image in step 412 as being captured by both the first camera 304 and the second camera 305. Therefore, in step 414, the model is further refined using this information. In examples where the model comprises a plurality of neural networks, labelling an image according to the capturing camera 304, 305 may allow a suitable neural network for a specific camera 304, 305 to be selected to refine. It will be appreciated that having distinct neural networks associated with each camera may be beneficial in allowing them to become adapted to the particular characteristics of their location and outlook and for recognising the front or rear of a vehicle respectively.

Thus it will be appreciated by those skilled in the art that the specific embodiments of the inventive concepts described herein provide systems and methods suitable for training a model to detect and/or classify vehicles in situ. This may provide significant benefits over known devices. It will further be appreciated that many variations of the specific arrangements described here are possible within the scope of the invention.

The invention claimed is:

1. A vehicle detection system comprising:
 a receiver arranged to receive data transmissions from a vehicle;
 a camera arranged to capture an image of said vehicle; and
 a processing subsystem arranged to implement a trained model for detecting and/or classifying vehicles in an image;
 wherein the vehicle detection system is arranged to use information resulting from said data transmissions from the vehicle together with said captured images of the vehicle to provide data for improving the trained model, the vehicle detection system being further arranged to use the trained model to detect and/or classify the vehicle in the image if no data transmission is received.

2. The vehicle detection system of claim 1 wherein the system is arranged to operate in at least a first mode wherein:
 the camera captures an image of a vehicle and the receiver receives a data transmission from the vehicle; and
 the processing subsystem is arranged to use information resulting from the data transmission received and the image to train the model further; and
 a second mode wherein:
 the camera captures an image of a vehicle and the receiver does not receive a data transmission; and
 the processing subsystem is arranged to use the image and the trained model to detect and/or classify the vehicle in the image.

3. The vehicle detection system of claim 1 wherein the trained model comprises a neural network.

4. The vehicle detection system of claim 3 wherein the neural network comprises a convolutional neural network.

5. The vehicle detection system of claim 4 wherein the convolutional neural network is arranged to provide an output image where a resulting size of the output image is independent of a size of the image of the vehicle.

6. The vehicle detection system of claim 4 wherein the convolutional neural network is arranged to apply a non-linear convolution step to extract a strongest image feature in each of a plurality of subsections.

7. The vehicle detection system of claim 2 wherein the data transmission comprises a unique identification code.

8. The vehicle detection system of claim 2 wherein the data transmission comprises at least one vehicle parameter.

9. The vehicle detection system of claim 2 arranged to send data from the data transmission to an external server and to receive from the server at least one vehicle parameter.

10. The vehicle detection system of claim 2 arranged, in the second mode of operation, to identify the vehicle by determining at least one vehicle parameter using the captured image.

11. The vehicle detection system of claim 8 wherein the processing subsystem is arranged, in the first mode, to use the vehicle parameter to train the model further by correlating the vehicle parameter to the captured image.

12. The vehicle detection system of claim 1 comprising a plurality of cameras.

13. The vehicle detection system of claim 1 arranged to track the vehicle using a plurality of images.

14. The vehicle detection system of claim 1 arranged to acquire a transmission from the vehicle using a polling operation.

15. The vehicle detection system of claim 1 wherein the processing subsystem is arranged to pre-process the image based on external information separate from the image and the data transmission.

16. The vehicle detection system of claim 15 comprising a plurality of neural networks and arranged to selectively train a specific neural network depending on the external information relating to conditions during capture of the image.

17. The vehicle detection system of claim 1 arranged to pre-process the captured image based on conditions in a locality of the system.

18. The vehicle detection system of claim 1 comprising a sensor subsystem arranged to monitor conditions in a locality of the system.

19. A method of detecting vehicles, the method comprising:
capturing an image of a vehicle using a camera;
using a receiver to listen for a data transmission from the vehicle;
if a data transmission is received from the vehicle, using information resulting from the data transmission together with the captured image of the vehicle to provide data for improving a trained model, and
if no data transmission is received from the vehicle, using the trained model to detect and/or classify the vehicle in the image.

20. A non-transitory computer-readable medium having stored thereon program instructions that, upon execution by a computing device, cause the computing device to:
capture an image of a vehicle using a camera;
listen for a data transmission from the vehicle;
if a data transmission is received from the vehicle, use information resulting from the data transmission together with the captured image of the vehicle to provide data for improving a trained model, and
if no data transmission is received from the vehicle, use the image and the trained model to detect and/or classify the vehicle in the image.

* * * * *